United States Patent [19]

Shimizu et al.

[11] Patent Number: 5,699,522
[45] Date of Patent: Dec. 16, 1997

[54] DATA PROCESSING SYSTEM WITH FAST MESSAGE PROCESSING FOR UPGRADED INPUT/OUTPUT STATIONS

[75] Inventors: Clifford Shiroku Shimizu, Rancho Santa Margarita; Patricia Lynn Walsh, Santa Ana; Anthony La Vel Crider, Rancho Santa Margarita, all of Calif.

[73] Assignee: Unisys Corporation, Blue Bell, Pa.

[21] Appl. No.: 606,356

[22] Filed: Feb. 23, 1996

[51] Int. Cl.$^6$ .................................................. G06F 15/56
[52] U.S. Cl. ........................... 395/200.15; 395/243
[58] Field of Search ........................ 395/200.01, 200.15, 395/243, 242

[56] References Cited

U.S. PATENT DOCUMENTS

| | | | |
|---|---|---|---|
| 5,088,090 | 2/1992 | Yacoby | 370/85.13 |
| 5,253,167 | 10/1993 | Yoshida et al. | 364/408 |
| 5,267,149 | 11/1993 | Anada et al. | 364/408 |
| 5,367,681 | 11/1994 | Foss et al. | 395/650 |
| 5,389,773 | 2/1995 | Coutts et al. | 235/379 |
| 5,563,878 | 10/1996 | Blakeley et al. | 370/60 |
| 5,594,866 | 1/1997 | Nugent | 395/200.13 |
| 5,594,872 | 1/1997 | Kawano et al. | 395/200.15 |
| 5,602,839 | 2/1997 | Annapareddy et al. | 370/405 |

*Primary Examiner*—Krisna Lim
*Assistant Examiner*—Zarni Maung
*Attorney, Agent, or Firm*—Charles J. Fassbender; Mark T. Starr; Steven R. Petersen

[57] ABSTRACT

A data processing system includes a digital computer that has a plurality of data processing programs. A set of upgraded stations is coupled to the computer which generate messages that employ a relatively simple format to select the data processing programs; and a set of older stations is also coupled to the computer which generate messages that employ a complex format to select the data processing programs. A message routing program in the computer receives all of the messages from the stations, analyzes each message that has the simple format to identify the selected data processing program, and sends the message directly to the selected program. By comparison, the message routing program sends each message that has the complex format to a secondary routing program; and this secondary routing program analyzes each message which it receives, identifies the selected data processing program, and sends the message to the selected program. When the message routing program, the secondary routing program, and the data processing programs are executed sequentially within the computer in respective time intervals, the average time to process a message with a simple format from an upgraded station is not impeded by the messages with the complex format from the older stations.

11 Claims, 8 Drawing Sheets

CASE A

| TIME | ACTION | MRP IQ | MRP OQ | SRP Q | P1 Q | P2 Q | P3 Q | P4 Q |
|---|---|---|---|---|---|---|---|---|
| T0 | S1 M (P1)→MRP IQ<br>S2 M (P2)→MRP IQ<br>S3 M (P3)→MRP IQ<br>S4 M (P4)→MRP IQ<br>S5 M (P1)→MRP IQ<br>S6 M (P2)→MRP IQ<br>S7 M (P3)→MRP IQ<br>S8 M (P4)→MRP IQ<br>S9 M (P1)→MRP IQ | S1 M (P1)<br>S2 M (P2)<br>S3 M (P3)<br>S4 M (P4)<br>S5 M (P1)<br>S6 M (P2)<br>S7 M (P3)<br>S8 M (P4)<br>S9 M (P1) | - | - | - | - | - | - |
| T1 (MRP) | S1 M (P1)→P1 Q<br>S2 M (P2)→SRP Q<br>S3 M (P3)→P3 Q<br>S4 M (P4)→SRP Q | S5 M (P1)<br>S6 M (P2)<br>S7 M (P3)<br>S8 M (P4)<br>S9 M (P1) | - | S2 M (P2)<br>S4 M (P4) | S1 M | - | S3 M | - |
| T2 (MRP) | S5 M (P1)→SRP Q<br>S6 M (P2)→P2 Q<br>S7 M (P3)→SRP Q<br>S8 M (P4)→P4 Q | S9 M (P1) | - | S2 M (P2)<br>S4 M (P4)<br>S5 M (P1)<br>S7 M (P3) | S1 M | S6 M | S3 M | S8 M |
| T3 (P1) | P1 PROCESSES S1 M<br>S1 R→MRP OQ | S9 M (P1) | S1 R | • | - | S6 M | S3 M | S8 M |
| T4 (P2) | P2 PROCESSES S6 M<br>S6 R→MRP OQ | S9 M (P1) | S1 R<br>S6 R | • | - | - | S3 M | S8 M |
| T5 (P3) | P3 PROCESSES S3 M<br>S3 R→MRP OQ | S9 M (P1) | S1 R<br>S6 R<br>S3 R | • | - | - | - | S8 M |
| T6 (P4) | P4 PROCESSES S8 M<br>S8 R→MRP OQ | S9 M (P1) | S1 R<br>S6 R<br>S3 R<br>S8 R | • | - | - | - | - |
| T7 (SRP) | SRP ROUTES S2 M(P2) | S9 M(P1) | S1 R<br>S6 R<br>S3 R<br>S8 R | S4 M (P4)<br>S5 M (P1)<br>S7 M (P3) | - | S2 M | - | - |
| T8 (MRP) | S1 R→S1<br>S9 M (P1)→P1 Q<br>S6 R→S6<br>S3 R→S3 | - | S8 R | • | S9 M | S2 M | - | - |
| T9 (MRP) | S8 R→S8 | - | - | • | S9 M | S2 M | - | - |
| T10 (P1) | P1 PROCESSES S9 M<br>S9 R→MRP OQ | - | S9 R | • | - | S2 M | - | - |
| T11 (P2) | P2 PROCESSES S2 M<br>S2 R→MRP OQ | - | S9 R<br>S2 R | • | - | - | - | - |
| T12 (P3) | - | | S9 R<br>S2 R | • | - | - | - | - |
| T13 (P4) | - | | S9 R<br>S2 R | • | - | - | - | - |
| T14 (SRP) | SRP ROUTES S4 M (P4) | | S9 R<br>S2 R | S5 M (P1)<br>S7 M (P3) | - | - | - | S4 M |

*Figure 4A*

CASE A

| TIME | ACTION | MRP IQ | MRP OQ | SRP Q | P1 Q | P2 Q | P3 Q | P4 Q |
|---|---|---|---|---|---|---|---|---|
| T15 (MRP) | S9 R→S9<br>S2 R→S2 | - | - | S5 M (P1)<br>S7 M (P3) | - | - | - | S4 M |
| T16 (MRP) | - | - | - | • | - | - | - | S4 M |
| T17 (P1) | | - | - | • | - | - | - | S4 M |
| T18 (P2) | | - | - | • | - | - | - | S4 M |
| T19 (P3) | | - | - | • | - | - | - | S4 M |
| T20 (P4) | P4 PROCESSES S4 M<br>S4 R→MRP OQ | - | S4 R | • | - | - | - | - |
| T21 (SRP) | SRP ROUTES S5 M (P1) | - | S4 R | S7 M (P3) | S5 M | - | - | - |
| T22 (MRP) | S4 R→S4 | - | - | • | S5 M | - | - | - |
| T23 (MRP) | | - | - | • | S5 M | - | - | - |
| T24 (P1) | P1 PROCESSES S5 M<br>S5 R→MRP OQ | - | S5 R | • | - | - | - | - |
| T25 (P2) | | - | S5 R | • | - | - | - | - |
| T26 (P3) | | - | S5 R | • | - | - | - | - |
| T27 (P4) | | - | S5 R | • | - | - | - | - |
| T28 (SRP) | SRP ROUTES S7 M (P3) | - | S5 R | - | - | - | S7 M | - |
| T29 (MRP) | S5 R→S5 | - | - | - | - | - | S7 M | - |
| T30 (MRP) | | - | - | - | - | - | S7 M | - |
| T31 (P1) | | - | - | - | - | - | S7 M | - |
| T32 (P2) | | - | - | - | - | - | S7 M | - |
| T33 (P3) | P3 PROCESSES S7 M<br>S7 R→MRP OQ | - | S7 R | - | - | - | - | - |
| T34 (P4) | - | - | S7 R | - | - | - | - | - |
| T35 (SRP) | - | - | S7 R | - | - | - | - | - |
| T36 (MRP) | S7 R→S7 | - | - | - | - | - | - | - |
| T37 (MRP) | | - | - | - | - | - | - | - |

*Figure 4B*

| T | CASE A ||||||||| 
| --- | S1 | S2 | S3 | S4 | S5 | S6 | S7 | S8 | S9 |
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 7 | | | | | | | | | |
| 8 | X | | X | | | X | | | |
| 9 | | | | | | | | X | |
| 10 | | | | | | | | | |
| 11 | | | | | | | | | |
| 12 | | | | | | | | | |
| 13 | | | | | | | | | |
| 14 | | | | | | | | | |
| 15 | | X | | | | | | | X |
| 16 | | | | | | | | | |
| 17 | | | | | | | | | |
| 18 | | | | | | | | | |
| 19 | | | | | | | | | |
| 20 | | | | | | | | | |
| 21 | | | | | | | | | |
| 22 | | | | X | | | | | |
| 23 | | | | | | | | | |
| 24 | | | | | | | | | |
| 25 | | | | | | | | | |
| 26 | | | | | | | | | |
| 27 | | | | | | | | | |
| 28 | | | | | | | | | |
| 29 | | | | | X | | | | |
| 30 | | | | | | | | | |
| 31 | | | | | | | | | |
| 32 | | | | | | | | | |
| 33 | | | | | | | | | |
| 34 | | | | | | | | | |
| 35 | | | | | | | | | |
| 36 | | | | | | | X | | |
| 37 | | | | | | | | | |

*Figure 5*

CASE B

| TIME | ACTION | MRP IQ | MRP OQ | P1 Q | P2 Q | P3 Q | P4 Q |
|---|---|---|---|---|---|---|---|
| T0 | S1 M (P1)→MRP IQ<br>S2 M (P2)→MRP IQ<br>S3 M (P3)→MRP IQ<br>S4 M (P4)→MRP IQ<br>S5 M (P1)→MRP IQ<br>S6 M (P2)→MRP IQ<br>S7 M (P3)→MRP IQ<br>S8 M (P4)→MRP IQ<br>S9 M (P1)→MRP IQ | S1 M (P1)<br>S2 M (P2)<br>S3 M (P3)<br>S4 M (P4)<br>S5 M (P1)<br>S6 M (P2)<br>S7 M (P3)<br>S8 M (P4)<br>S9 M (P1) | - | - | - | - | - |
| T1 (MRP) | S1 M (P1)→P1 Q<br>S2 M (P2)...(3/4) | S3 M (P3)<br>S4 M (P4)<br>S5 M (P1)<br>S6 M (P2)<br>S7 M (P3)<br>S8 M (P4)<br>S9 M (P1) | - | S1 M | - | - | - |
| T2 (MRP) | S2 M (P2)→P2 Q (1/4)<br>S3 M (P4)→P3 Q<br>S4 M (P4)...(1/2) | S5 M (P1)<br>S6 M (P2)<br>S7 M (P3)<br>S8 M (P4)<br>S9 M (P1) | - | S1 M | S2 M | S3 M | - |
| T3 (P1) | P1 PROCESSES S1 M<br>S1 R→MRP OQ | S5 M (P1)<br>S6 M (P2)<br>S7 M (P3)<br>S8 M (P4)<br>S9 M (P1) | S1 R | - | S2 M | S3 M | - |
| T4 (P2) | P2 PROCESSES S2 M<br>S2 R→MRP OQ | S5 M (P1)<br>S6 M (P2)<br>S7 M (P3)<br>S8 M (P4)<br>S9 M (P1) | S1 R<br>S2 R | - | - | S3 M | - |
| T5 (P3) | P3 PROCESSES S3 M<br>S3 R→MRP OQ | S5 M (P1)<br>S6 M (P2)<br>S7 M (P3)<br>S8 M (P4)<br>S9 M (P1) | S1 R<br>S2 R<br>S3 R | - | - | - | - |
| T6 (P4) | - | S5 M (P1)<br>S6 M (P2)<br>S7 M (P3)<br>S8 M (P4)<br>S9 M (P1) | S1 R<br>S2 R<br>S3 R | - | - | - | - |
| T7 (MRP) | S4 M (P4)→P4 Q (1/2)<br>S1 R→S1<br>S5 M (P1)... (1/4) | S6 M (P2)<br>S7 M (P3)<br>S8 M (P4)<br>S9 M (P1) | S2 R<br>S3 R | - | - | - | S4 M |
| T8 (MRP) | S5 M (P1)→P1 Q (3/4)<br>S2 R→S2 | S6 M (P2)<br>S7 M (P3)<br>S8 M (P4)<br>S9 M (P1) | S3 R | S5 M | - | - | S4 M |
| T9 (P1) | P1 PROCESSES S5 M<br>S5 R→MRP OQ | S6 M (P2)<br>S7 M (P3)<br>S8 M (P4)<br>S9 M (P1) | S3 R<br>S5 R | - | - | - | S4 M |

*Figure 6A*

CASE B

| TIME | ACTION | MRP IQ | MRP OQ | P1 Q | P2 Q | P3 Q | P4 Q |
|---|---|---|---|---|---|---|---|
| T10 (P2) | - | S6 M (P2)<br>S7 M (P3)<br>S8 M (P4)<br>S9 M (P1) | S3 R<br>S5 R | - | - | - | S4 M |
| T11 (P3) | - | S6 M (P2)<br>S7 M (P3)<br>S8 M (P4)<br>S9 M (P1) | S3 R<br>S5 R | - | - | - | S4 M |
| T12 (P4) | P4 PROCESSES S4 M<br>S4 R→MRP OQ | S6 M (P2)<br>S7 M (P3)<br>S8 M (P4)<br>S9 M (P1) | S3 R<br>S5 R<br>S4 R | - | - | - | - |
| T13 (MRP) | S6 M (P2)→P2 Q<br>S3 R→S3<br>S7 M (P3)...(1/2) | S8 M (P4)<br>S9 M (P1) | S5 R<br>S4 R | - | S6 M | - | - |
| T14 (MRP) | S7 M (P3)→P3 Q (1/2)<br>S5 R→S5<br>S8 M (P4)...P4 Q | S9 M (P1) | S4 R | - | S6 M | S7 M | S8 M |
| T15 (P1) | - | S9 M (P1) | S4 R | - | S6 M | S7 M | S8 M |
| T16 (P2) | P2 PROCESSES S6 M<br>S6 R→MRP OQ | S9 M (P1) | S4 R<br>S6 R | - | - | S7 M | S8 M |
| T17 (P3) | P3 PROCESSES S7 M<br>S7 R→MRP OQ | S9 M (P1) | S4 R<br>S6 R<br>S7 R | - | - | - | S8 M |
| T18 (P4) | P4 PROCESSES S8 M<br>S8 R→MRP OQ | S9 M (P1) | S4 R<br>S6 R<br>S7 R<br>S8 R | - | - | - | - |
| T19 (MRP) | S9 M (P1)→P1 Q<br>S4 R→S4<br>S6 R→S6<br>S7 R→S7 | - | S8 R | S9 M | - | - | - |
| T20 (MRP) | S8 R→S8 | - | - | S9 M | - | - | - |
| T21 (P1) | P1 PROCESSES S9 M<br>S9 R→MRP OQ | - | S9 R | - | - | - | - |
| T22 (P2) | - | - | S9 R | - | - | - | - |
| T23 (P3) | - | - | S9 R | - | - | - | - |
| T24 (P4) | - | - | S9 R | - | - | - | - |
| T25 (MRP) | S9 R→S9 | - | - | - | - | - | - |
| T26 (MRP) | - | - | - | - | - | - | - |

*Figure 6B*

| T | CASE B | | | | | | | | |
|---|---|---|---|---|---|---|---|---|---|
| | S1 | S2 | S3 | S4 | S5 | S6 | S7 | S8 | S9 |
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 7 | X | | | | | | | | |
| 8 | | X | | | | | | | |
| 9 | | | | | | | | | |
| 10 | | | | | | | | | |
| 11 | | | | | | | | | |
| 12 | | | | | | | | | |
| 13 | | | X | | | | | | |
| 14 | | | | | X | | | | |
| 15 | | | | | | | | | |
| 16 | | | | | | | | | |
| 17 | | | | | | | | | |
| 18 | | | | | | | | | |
| 19 | | | | X | | X | X | | |
| 20 | | | | | | | | X | |
| 21 | | | | | | | | | |
| 22 | | | | | | | | | |
| 23 | | | | | | | | | |
| 24 | | | | | | | | | |
| 25 | | | | | | | | | X |
| 26 | | | | | | | | | |
| 27 | | | | | | | | | |
| 28 | | | | | | | | | |
| 29 | | | | | | | | | |
| 30 | | | | | | | | | |
| 31 | | | | | | | | | |
| 32 | | | | | | | | | |
| 33 | | | | | | | | | |
| 34 | | | | | | | | | |
| 35 | | | | | | | | | |
| 36 | | | | | | | | | |
| 37 | | | | | | | | | |

*Figure 7*

AVERAGE MESSAGE RESPONSE TIME

| | STATIONS WHICH SEND MESSAGES WITH SIMPLE FORMAT (S1,S3,S6,S8,S9) | STATIONS WHICH SEND MESSAGES WITH COMPLEX FORMAT (S2,S4,S5,S7) |
|---|---|---|
| FIG. 4A-4B | 9.6 TIME INTERVALS | 25.8 TIME INTERVALS |
| FIG. 6A-6B | 16.8 TIME INTERVALS | 12.5 TIME INTERVALS |

*Figure 8*

DATA PROCESSING SYSTEM WITH FAST MESSAGE PROCESSING FOR UPGRADED INPUT/OUTPUT STATIONS

BACKGROUND OF THE INVENTION

This invention relates to the structure and operation of data processing systems where messages are sent from a plurality of input/output stations to a mainframe digital computer which in turn examines the messages and processes them by respective programs which the messages select. More particularly, this invention relates to the speed at which the messages are processed and responses are generated for the input/output stations.

One common example of the above data processing system occurs in a bank. There, a mainframe digital computer is provided which has a data file on each customer of the bank; and that data file is accessed and modified through the computer by messages from various input/output stations. Typically, the bank will have several branch offices; and at each branch, the data files can be accessed from stations which are operated by bank tellers or from automated teller machines which are operated by the bank customers. For a large bank, hundreds of these input/output stations can exist.

As the total number of input/output stations which are coupled to the mainframe computer increases, it becomes more and more infeasible for all of the stations to send their messages with the same format. This is because from time to time, new models and new types of input/output stations become available which, due to their internal makeup, generate messages for the mainframe computer with new formats that previously did not exist.

Consequently, if some (but not all) of the stations in the data processing system are replaced with a new model as an upgrade, then the messages which the mainframe computer receives will have two different formats. As a practical matter, replacing just some of the stations is likely to occur because to replace all of the stations with a new model will be too expensive when the number of stations is large.

Now, when some of the input/output stations are replaced with new models, it is critical that the message response time for those new models is not significantly degraded by the presence of the original stations which remain on the system. Otherwise, there is no incentive to make the investment which is required to replace any of the original stations. However, if the original stations send their messages to the mainframe computer with a format which is much more complex than the format of the messages which are sent by the new model stations, this can cause a substantial decrease in the speed with which the messages are processed for the new model stations. An example of this problem is described in detail in the Detailed Description in conjunction with FIGS. 6A and 6B.

Accordingly, a primary object of the present invention is to provide a data processing system in which the above problem is overcome.

BRIEF SUMMARY OF THE INVENTION

In accordance with the present invention, a data processing system includes a digital computer that has a plurality of data processing programs; a first set of stations, coupled to the computer, which generate messages that employ a relatively simple format to select the data processing programs; and a second set of stations, coupled to the computer, which generate messages that employ a substantially more complex format to select the data processing programs. Further included in the data processing system is a message routing program within the computer which receives all of the messages from the stations, analyzes each message that has the first format to identify the selected data processing program, and sends the message directly to the selected program. Also included in the data processing system is a secondary routing program within the computer, and the message routing program is structured to send each message that has the second format to the secondary routing program. This secondary routing program analyzes each message which it receives, identifies the selected data processing program, and sends the message to the selected program. When the message routing program, the secondary routing program, and the data processing programs are executed sequentially by the computer in respective time intervals, the messages with the complex second format have a minimal impact on the rate at which the messages with the first format reach their selected program.

DETAILED DESCRIPTION

Figure 1:
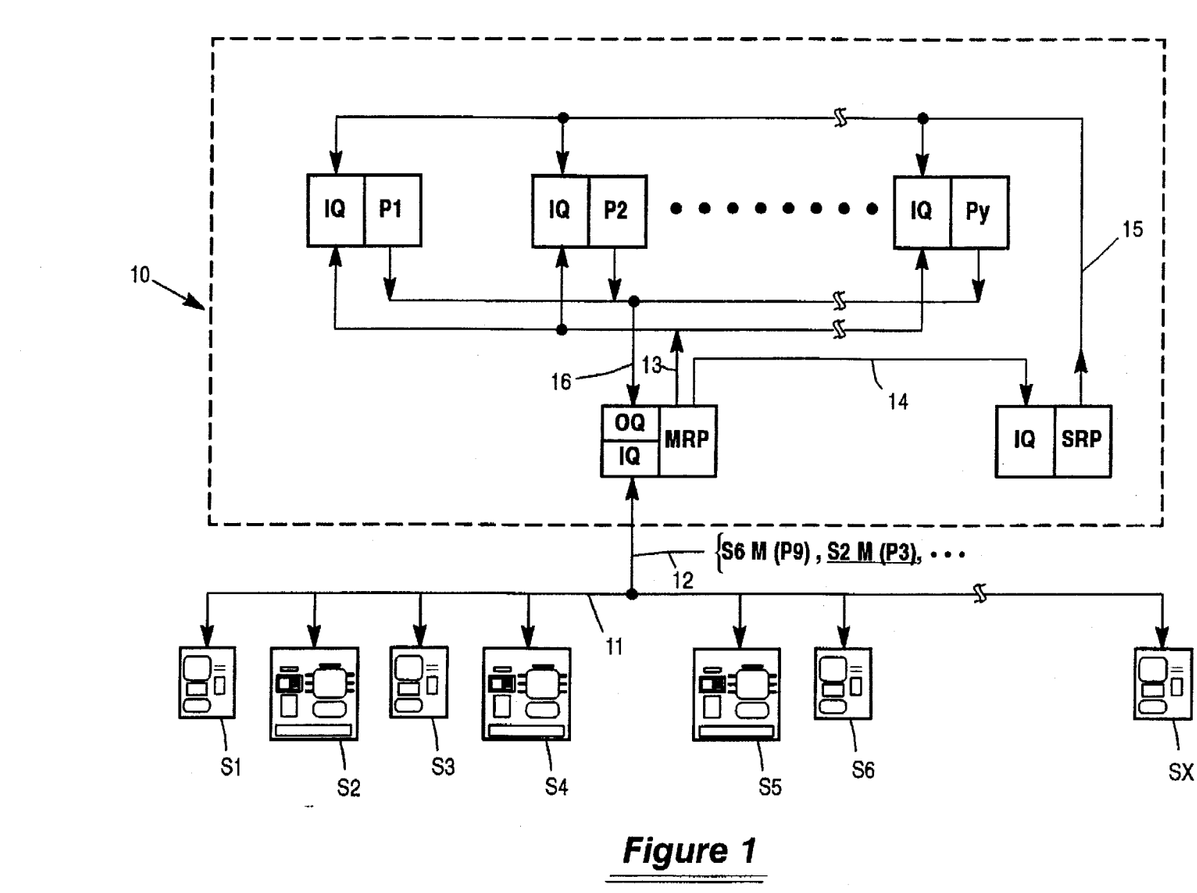
FIG. 1 shows a data processing system which constitutes one preferred embodiment of the invention.

Referring now to FIG. 1, a data processing system which constitutes one preferred embodiment of the invention will be described in detail. This FIG. 1 embodiment includes a mainframe digital computer 10, and a plurality of input/output stations S1, S2, ... SX (where X is a positive integer) which are coupled to the computer 10 via a communications channel 11. In FIG. 1, the stations S1, S3, S6, and SX are illustrated with one particular symbol; whereas the stations S2, S4, and S5 are illustrated with a different symbol. These two symbols are used because each of the stations S1, S3, S6, and SX is one type of station; while each of the stations S2, S4, and S5 is a different type of station. As one example, each station S1, S3, 86 and SX is the latest model of an automated teller machine (ATM) in several branches of a bank; and each station S2, S4, and S5 is an older model of an ATM at other branches of the same bank.

In operation, all of the stations S1 through SX send messages over the channel 11 for processing by the computer 10. One sequence of these messages is identified in FIG. 1 by reference numeral 12; and in that sequence, the first message which occurs is notated as S6M(P9). This notation S6M(P9) indicates that station S6 sends a message M which requests the use of a data processing program P9 within the computer 10. Similarly, the second message in the message sequence 12 is notated as S2M(P3), and this indicates that station S2 sends a message M which requests the use of a data processing program P3 within the computer 10.

Due to the internal make-up of the stations S1, S3, S6 and SX, they each employ a particular first format in the messages which they send in order to select a data processing program. By comparison, due to the different make-up of the other stations S2, S4, and S5, they each employ a second format in the messages which they send to select a data processing program; and, this second format is substantially more complex than the first format.

In the message sequence 12, underlining is used to identify each message which employs the complex format to select a data processing program. Thus, the second message S2M(P3) uses the complex format to select program P3, while the first message S6M(P9) uses the simple format to select program P9. One specific example of the first and second formats is shown in FIGS. 2 and 3.

Figure 2:
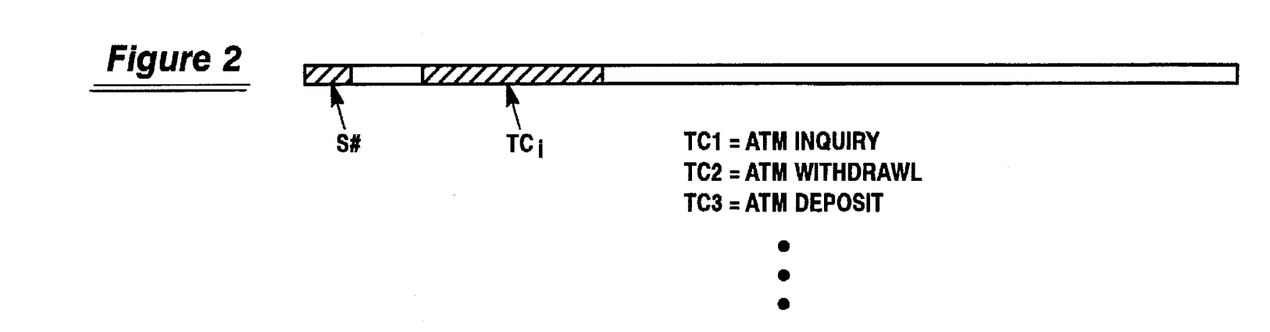
FIG. 2 shows the format of the messages which are sent by a first type of input/output station in the FIG. 1 data processing system.

With the simple first format of FIG. 2, the data processing programs P1, P2, etc., are selected by a Transaction Code TCi which occurs at a fixed location in the message. Each Transaction Code is an English word that describes an operation which a program is to perform. For example, Transaction Code TC1 is the word "inquiry"; Transaction Code TC2 is the word "withdrawal"; Transaction Code TC3 is the word "deposit"; etc.

Figure 3:
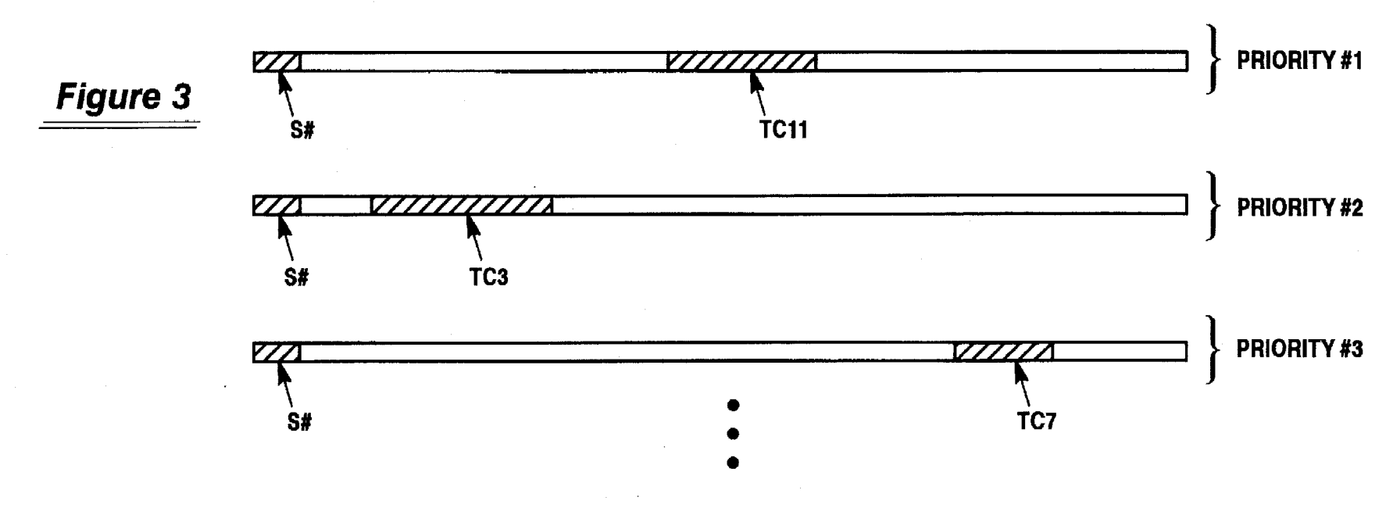
FIG. 3 shows the format of the messages which are sent by a second type of input/output station in the FIG. 1 data processing system.

By comparison, with the complex second format of FIG. 3, each Transaction Code occurs at a different location in the message. For example, Transaction Code TC11 occurs near the middle of a message; Transaction code TC13 occurs near the start of a message; and Transaction Code TC7 occurs near the end of the message. Also, with the complex second format, the operations which the Transaction Codes specify must be performed with a certain priority. For example, in FIG. 3, Transaction Code TC11 has the first priority; Transaction Code TC3 has the second priority; etc.

All of the data processing programs which are requested by the messages from the stations S1 through SX are shown within the FIG. 1 computer 10 as programs P1, P2, ... PY (where Y is a positive integer). Each of these programs performs a particular operation on the message which selects its execution and generates a response for the station which sent the message. For example, program P1 can make a deposit into a savings account for the operator of an ATM and generate a response which indicates the balance in the account; program P2 can make a withdrawal from the savings account of an operator of an ATM and generate a response which indicates the balance in the account; etc.

Also included in the FIG. 1 computer 10 is a message routing program (which is identified in FIG. 1 as MRP) and a secondary routing program (which is identified in FIG. 1 as SRP). These two routing programs operate together in a novel fashion to transfer the messages from all of the stations S1–SX to the particular data processing programs P1–PY which those messages select, and to transfer the responses back to the stations.

Within the FIG. 1 computer 10, the message routing program MRP, the secondary routing program SRP, and the data processing program P1 through PY are executed sequentially in respective time intervals. In one embodiment, the respective time intervals for these programs occur in a single repetitive sequence. In another embodiment, the respective time intervals for these programs occur in a variable sequence in which each program is given a respective time interval only when the program has a message or a response to process.

Initially, the messages from the stations S1–SX are loaded into an input queue IQ for the message routing program MRP. Thereafter, when a time interval occurs for the message routing program MRP to operate, that program acts upon the messages which are in its input queue. For each message which employs the simple first format to select a data processing program, the MRP fully analyzes the message to identify the particular data processing program which is selected and it sends the message directly to the selected program. By comparison, for each message which employs the complex second format to select a data processing program, the MRP simply sends the message to the secondary routing program.

In FIG. 1, messages with the simple first format pass from the message routing program directly to one of the data processing programs P1–PY on a message transfer path 13. Each message which selects program P1 is loaded into an input queue IQ for the program P1; each message which selects program P2 is loaded into an input queue IQ for the program P2; etc. By comparison, all messages with the second complex format pass from the message routing program MRP to an input queue IQ for the secondary routing program SRP on a message transfer path 14.

When the time interval for the message routing program is over, each of the data processing programs P1, P2, ... PY is given a respective time interval during which it operates on a message which it has received. For each response which is generated, that response is sent by the data processing program on a path 15 to an output queue OQ of the message routing program.

When the time intervals for the data processing programs P1, P2, ... PY are over, a time interval occurs for the secondary routing program SRP to operate. During that time interval, the secondary routing program fully analyzes a message from its input queue to identify the particular data processing program which that message selects, and it sends the message as indicated by a message transfer path 15 to the selected data processing program. Thereafter, when the time interval for the secondary routing program SRP is complete, the above-described sequence for executing all of the programs is repeated.

A primary feature of the above-described data processing system is that the stations which use the complex second format do not hinder the message response time of the stations which use the simple first format. This feature is important when all of the stations S1 through SX initially are the complex second type stations; and subsequently, an upgrade is made by replacing some of the second type stations with the simple first type stations. When such an upgrade is made, it is critical that the message response time for the simple first type stations on the system is not degraded by the presence of the complex second type stations on the same system. If the response time of the simple first type stations is degraded, then the system can be upgraded only by replacing all of the stations; but, that can be far too expensive to be practical.

Figure 4A:
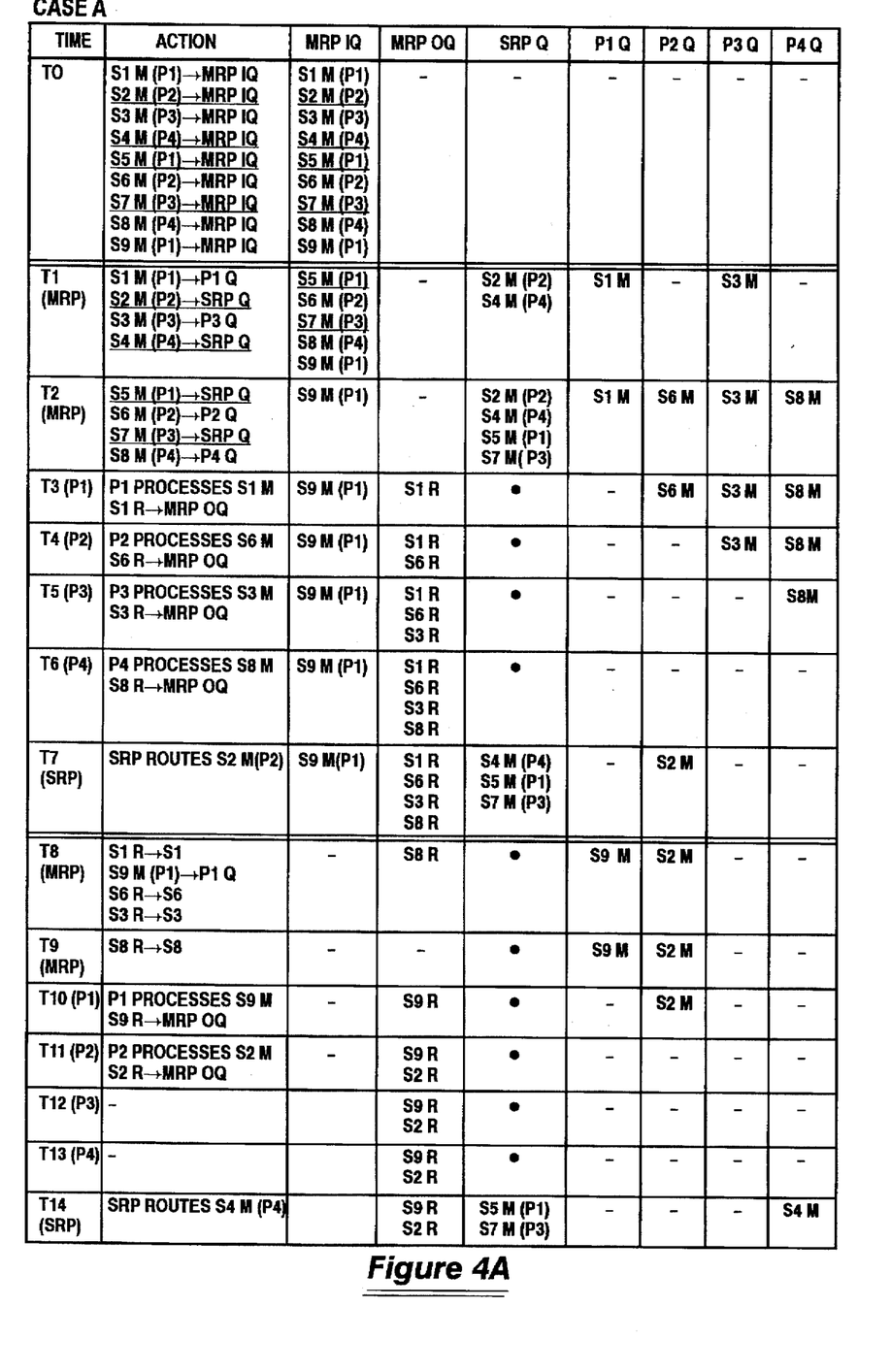
FIGS. 4A–4B show the time sequence by which several messages, with the formats of FIGS. 2 and 3, are processed by the FIG. 1 data processing system.
Figure 4B:
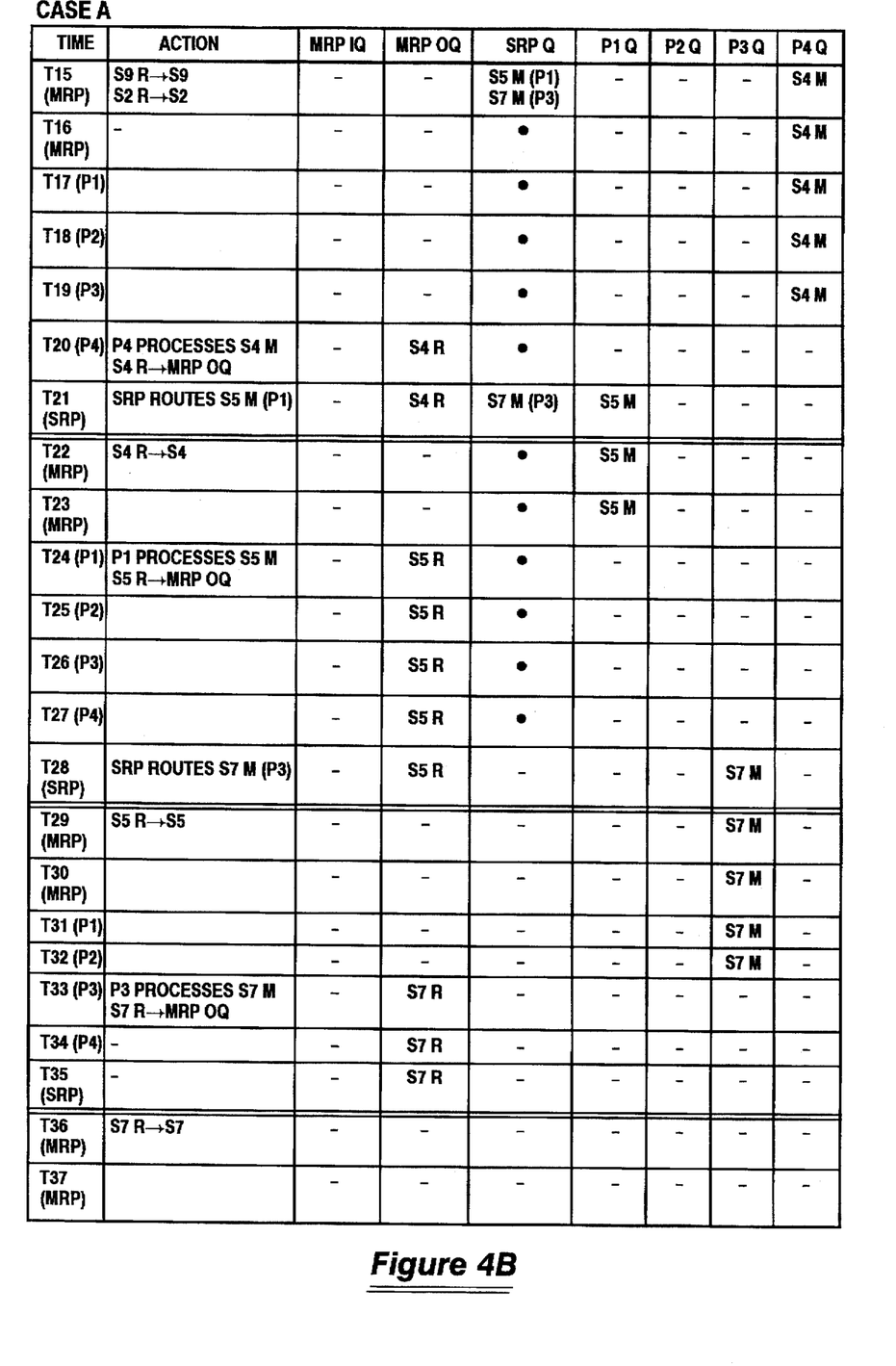

To illustrate the above feature, FIGS. 4A and 4B are provided wherein messages from nine stations S1–S9 are processed by the system of FIG. 1. Further in this example, the stations S1, S3, S6, S8, and S9 use the simple message format to select a data processing program; whereas the stations S2, S4, S5 and S7 use the complex message format to select a data processing program. Here again, underlining is used to identify a message with a complex format.

FIGS. 4A and 4B are in the form of a table in which the rows are labeled T0, T1, T2, etc. Row T0 shows the initial state of the FIG. 1 data processing system. Row T1 shows the state of the FIG. 1 data processing system during the next time interval T1. Row T2 shows the state of the FIG. 1 data processing system during the next time interval T2; etc.

During the time intervals T1 and T2, the message routing program MRP is executed. Next, during the four time intervals T3 through T6, the data processing programs P1 through P4 are respectively executed. Then, during time interval T7, the secondary routing program SRP is executed. Thereafter, execution of all of the programs MRP, P1, P2, P3, P4, and SRP is repeated in the same sequence during the time intervals T8–T14, T15–T21, etc.

Also in FIGS. 4A and 4B, each row is subdivided into sections which are labeled ACTION, MRPIQ, MRPOQ, SRPQ, P1Q, P2Q, P3Q, and P4Q. In the ACTION section, entries are provided which indicate what the currently active program is doing. In the MRPIQ section, messages are listed which are in the input queue of the message routing program; and in the MRPOQ section, messages are listed which are in the output queue of the message routing program. Likewise, in the sections SRPQ, P1Q, P2Q, P3Q, and P4Q, messages are listed which respectively are in the queue of the programs SRP, P1, P2, P3, and P4.

Consider now row T0 of FIG. 4A. There, the MRPIQ section shows the nine messages which are in the input queue of the message routing program. At the top of the queue is a message S1M(P1). This is a message from station S1 which employs the simple format of FIG. 2 to request the use of the data processing program P1. Next in the input queue of the message routing program is the message S2M(P2). This is a message from station S2 which uses the complex format of FIG. 3 to request the use of the data processing program P2. All of the other messages in the input queue of the message routing program are notated in the same fashion.

During time intervals T1 and T2, the message routing program MRP examines the messages which are in its input queue. For illustrative purposes, it will be assumed that the message routing program takes ¼ of a time interval to examine and route a message to a data processing program if that message has the simple format of FIG. 2. Also it will be assumed that the message routing program takes ¼ of a time interval to determine when a message has the complex format of FIG. 3 and route that message to the secondary routing program. Further it will be assumed that the secondary program takes a complete time interval to examine a single message with the complex format and route the message to the data processing program which is selected.

Thus, in time interval T1, the message routing program uses ¼ of a time interval to route the first message S1M(P1) to the input queue of program P1. Then, the message routing program uses another ¼ of the time interval T1 to route the message S2M(P2) to the input queue of the secondary routing program. Next, the message routing program uses another quarter of the time interval T1 to route the message S3M(P3) to the input queue of the data processing program P3. Lastly, the message routing program uses ¼ of the time interval T1 to route the message as S4M(P4) to the input queue of the secondary routing program.

Following the above action, the input queue of the message routing program holds five messages which are listed in the MRPIQ section of row T1. Four of those messages are then examined and routed by the message routing program during time interval T2. Thus, at the end of time interval T2, only a single message S9M(P1) remains in the input queue of the message routing program. Also at the end of time interval T2, the input queue of the secondary routing program holds four messages which are listed in the SRPQ section; and, the respective input queues for the data processing programs P1–P4 each hold a single message as listed in the sections labeled P1Q–P4Q.

Next, during time interval T3, the data processing program P1 operates on the message S1M which is in the program P1 input queue. As part of that operation, the data processing program P1 generates a response S1R for station S1 and loads that response in the output queue of the message routing program. Similarly, during the time intervals T4, T5, and T6, the data processing programs P2, P3, and P4, respectively operate on the messages S6M, S3M, and SS8M; and those programs respectively load the responses S6R, S3R, and S8R into the output queue of the message routing program.

Next, during time interval T7, the secondary routing program examines the message S2M(P2) which is at the top of its input queue. This message uses the complex format to select data processing programs; and the complete T7 time interval is needed to determine that the data processing program P2 is selected. Thus, at the end of time interval T7, three other messages which use the complex format remain in the input queue of the secondary routing program.

Next, during time intervals T8 and T9, the message routing program MRP operates to route more messages and their responses. In particular, during time interval T8, the message routing program sends the response S1R to station S1; then it sends the message S9M(P1) to the input queue of program P1; then it sends the response S6R to station S6; and then it sends the response S3R to station S3. At the end of time interval T8, the input queue for the message routing program is completely empty, and only a single response S8R remains in the output queue of the message routing program. That response S8R is then sent by the message routing program to station S8 during time interval T9.

Next, during time intervals T10 and T11, the data processing programs P1 and P2 respectively operate on the messages S9M and S2M which are in their input queues; and, those programs P1 and P2 respectively send the responses S9R and S2R to the output queue of the message routing program. During time intervals T12 and T13, the data processing programs P3 and P4 are idle because no messages are in their input queues. Then, during time interval T14, the secondary routing program analyzes another message S4M(P4) which is in its input queue to identify the particular data processing program which that message selects, and it sends the message to the selected program. At the end of time interval T14, two messages which use the complex format to select a data processing program remain in the input queue of the secondary routing program.

Next, during time interval T15, the message routing program sends the responses S9R and S2R respectively to the stations S9 and S2. When that action is complete, the output queue as well as the input queue for the message routing circuit is empty. Thereafter, during time intervals T16–T19, the message routing program and the data processing programs P1–P3 are idle because no messages are in their input queues. Then, in time interval T20, the data processing program P4 operates on the message S4M which is in its input queue; and during that operation, the program P4 loads a response S4R into the output queue of the message routing program. Then in time interval T21, the secondary routing program examines the message S5M(P1) which is in its input queue, determines that the data processing program P1 is selected, and sends the message to program P1.

Next, during time interval T22, the message routing program sends the response S4R to station S4. Thereafter, no further action is taken until time interval T24 in which the data processing program P1 operates on the message S5M and sends a response S5R to the output queue of the message routing program. Then, no further action is taken until time interval T28 during which the secondary routing program examines the last message S7M(P3) which is in its input queue and sends that message to its selected program.

Next, during time interval T29, the message routing program sends the response S5R to station S5. Thereafter, no action is taken until time interval T33 in which the data processing program P3 operates on the message S7M and sends a response to the output queue of the message routing program. Subsequently, during time interval T36, the response S7R is sent by the message routing program to station S7.

Figure 5:
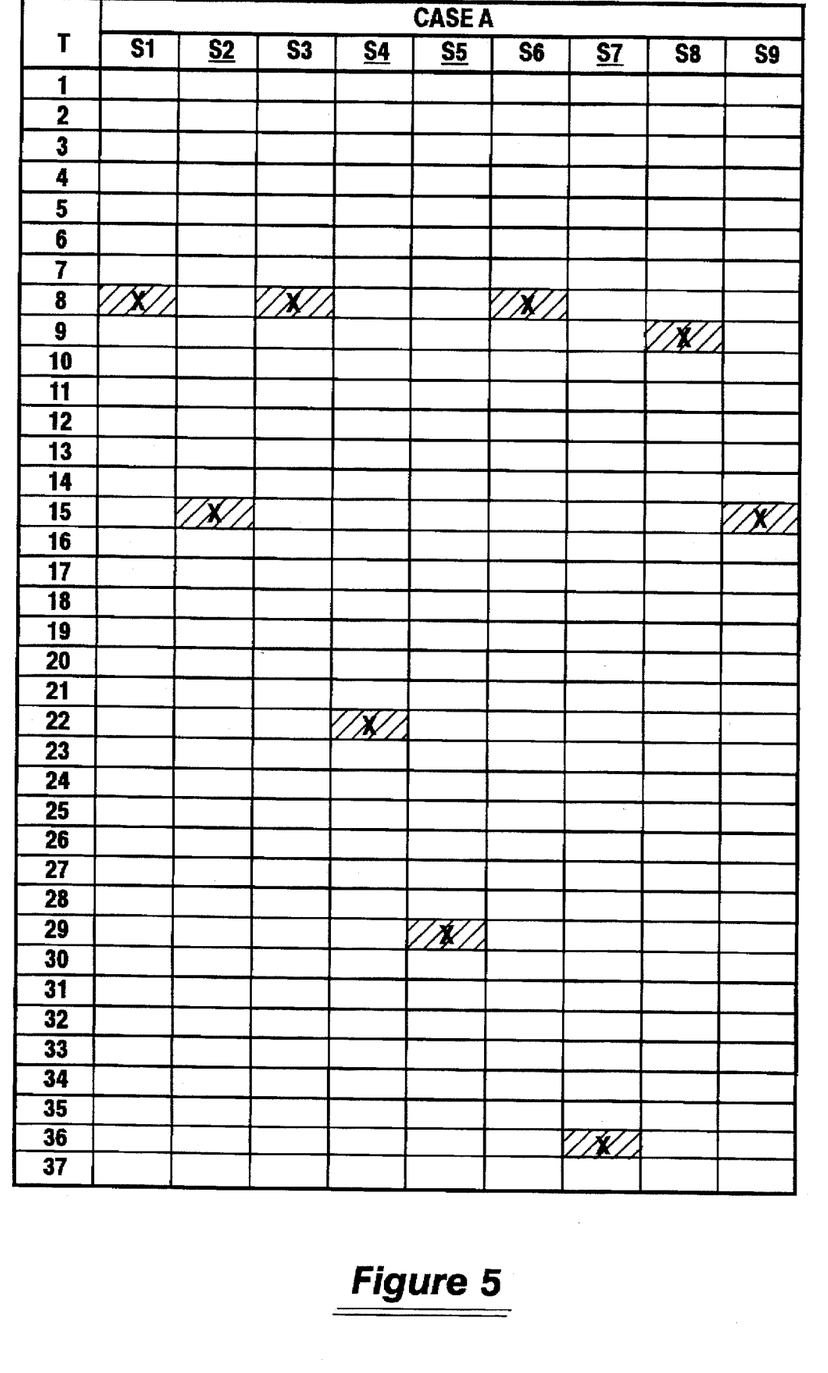
FIG. 5 shows the message response time for all of the messages which are processed in FIGS. 4A–4B.

From the above description of FIGS. 4A and 4B, the message response time of the stations S1–S9 can be illustrated as shown in FIG. 5. This figure shows that the response time for each of the stations which use the simple message format is: eight time intervals for stations S1 and S3 and S6, nine time intervals for station S8, and fifteen time intervals for station S9. By comparison, the response time of the stations which use the complex message format is: fifteen time intervals for station S2, twenty-two time intervals for station S4, twenty-nine time intervals for station S5, and thirty-six time intervals for station S7. Thus, the stations which use the simple format to select a data processing program have an average message response time of 9.6 time intervals; whereas the stations which use the complex message format to select a data processing program have an average message response time of 25.5 time intervals.

Figure 6A:
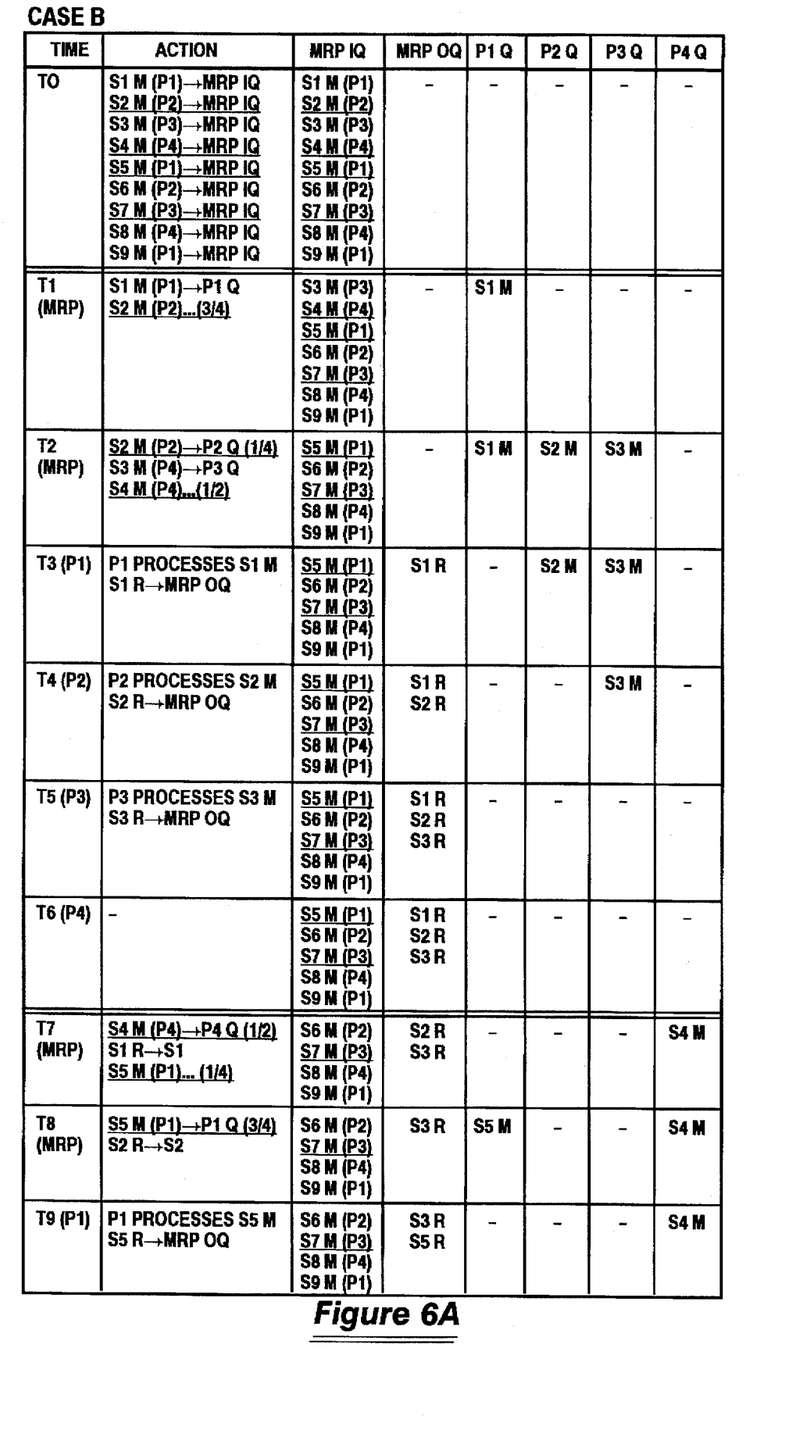
FIGS. 6A–6B show the time sequence by which several messages, with the formats of FIGS. 2 and 3, are processed by a modified version of the FIG. 1 data processing system in which the secondary routing program SRP is eliminated.
Figure 6B:
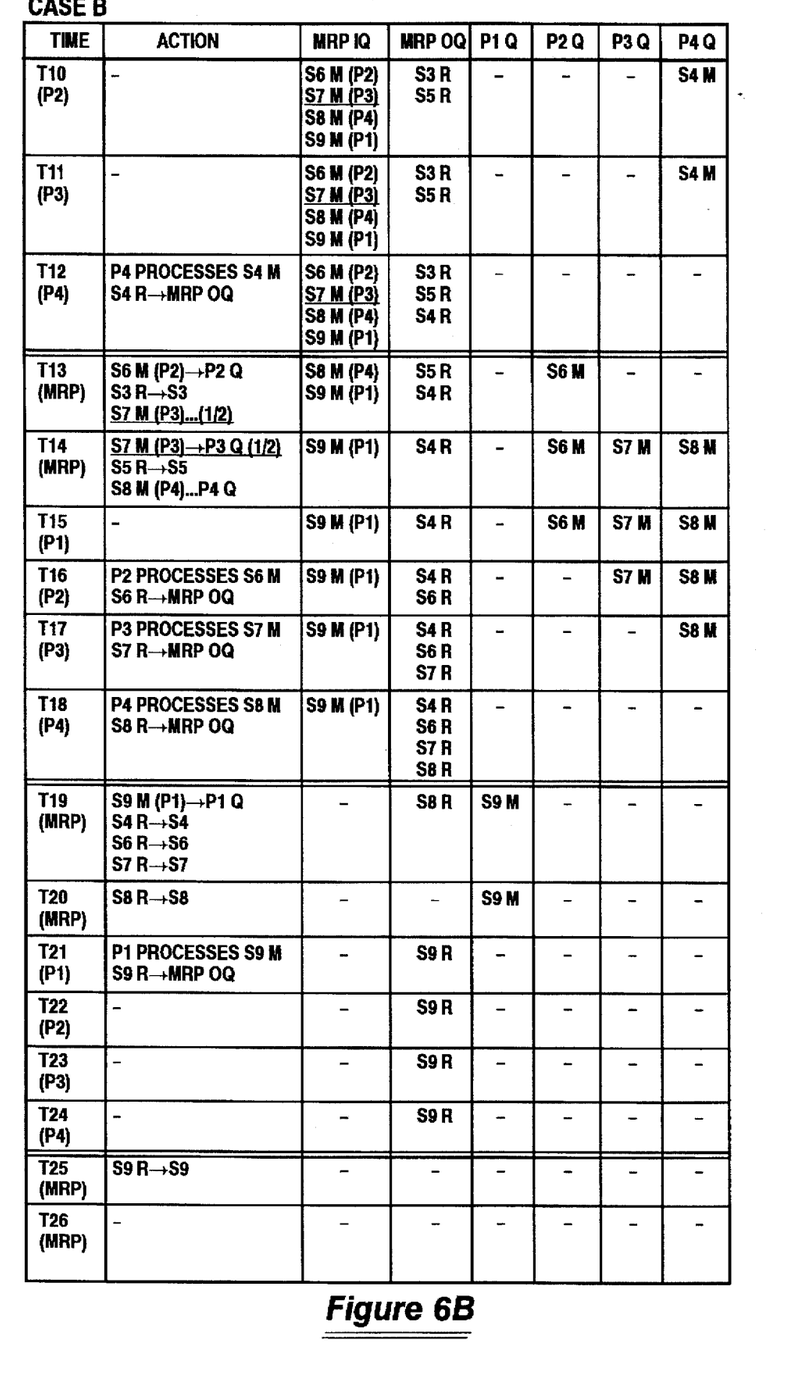

Now, for comparison purposes, suppose that a) the secondary routing program SRP is eliminated, and b) every message is fully examined by the message routing program MRP and sent directly to the data processing program which the message selects. If this modification is made, its effect on the message response time of the stations is shown by FIGS. 6A and 6B. Those FIGS. 6A and 6B are in the form of a table which has rows T0, T1, T2, etc.; and each row is subdivided into sections similar to the above-described table of FIGS. 4A and 4B.

In row T0, the MRPIQ section shows the nine messages which are in the input queue of the message routing program. Those nine messages are the same as the nine messages which are shown in row T0 or FIG. 4A. Here again, each message which employs the complex format to select a data processing program is underlined.

During time intervals T1 and T2, the message routing program MRP examines the messages which are in its input queue. At the top of that queue is the message S1M(P1) which uses the simple format to select the data processing program P1. Thus, the message routing program uses one-quarter of the time interval T1 to analyze the message S1M(P1) and send it to the input queue of program P1.

Next in the input queue of the message routing program is the message S2M(P2). This message uses the complex format to select the data processing program P2; and thus a full time interval is needed to analyze the message and determine which data processing program is selected. Three-quarters of this full time interval occurs during the time interval T1, and the remaining one-quarter of the full time interval occurs during time interval T2.

Next in the input queue of the message routing program is the message S3M(P4). This message uses the simple format to select the data processing program P3; and thus one-quarter of the time interval T2 is used to analyze the message S3M(P4) and send it to the input queue of program P3. Next, in the input queue of the data processing program is the message S4M(P4). This message uses the complex format to select the data processing program P4; and thus a full time interval is needed to fully analyze the message and determine that program P4 is selected. However, only one-half of the time interval T2 remains unused; so the analysis of the message S4M(P4) is only completed half-way during the time interval T2.

Next, during time interval T3, the data processing program P1 operates on the message S1M which is in its input queue. As part of that operation, the data processing program P1 generates a response S1R for station S1 and loads that response in the output queue of the message routing program. Similarly, during time intervals T4 and T5, the data processing programs P2 and P3 respectively operate on the messages S2M and S3M; and those programs respectively load the responses S2R and S3R into the output queue of the message routing program. Thereafter, during time interval T6, no action is taken by the data processing program P4 because it has no message in its input queue.

Next, during time intervals T7–T12, the above sequence for executing the message routing program and the data processing programs P1–P4 is repeated. Initially, during the first half of time interval T7, the message routing program completes its analysis of the message S4M(P4), and it sends that message to the input queue of the data processing program P4. Then the message routing program uses one-quarter of the time interval T7 to send the response S1R from its output queue to the station S1. Next, the message routing program uses a full time interval to analyze the message S5M(P1) and send that message to the input queue of the data processing program P1. One-quarter of this time interval occurs in time interval T7 and the remainder occurs in time interval T8. Then, the message routing program uses the last quarter of the time interval T8 to send a response S2R from its output queue to station S2.

Thereafter, during time intervals T9–T12, each data processing program P1–P4 which has a message in its input queue is able to operate. Thus, during time interval T9, the data processing program P1 operates on the message S5M and sends a response S5R to the output queue of the message routing program. Similarly, during time interval T12, the data processing program P4 operates on the message S4M, and it sends a response S4R to the output queue of the message routing program.

Next, during time intervals T13–T18, the sequence for executing the message routing program and the data processing programs P1–P4 is again repeated. At the start of time interval T13, the message routing program uses one-quarter of a time interval to analyze the message S6M(P2) and send it to the input queue of program P2. Then, the message routing program uses another one-quarter of a time interval to send the response S3R from its output queue to station S3. Then, the message routing program uses a full time interval to analyze the message S7M(P3) and send it to the input queue of the data processing P3. Next the message routing program uses one-quarter of a time interval to send the response S5R from its output queue to station S5. Then the message routing program uses one-quarter of a time interval to analyze the message S8M(P4) and send it to the input queue of program P4.

Thereafter, during time intervals T15–T18, each data processing program which has a message in its input queue is able to operate. Consequently, program P2 operates on the message S6M and generates a response S6R; then program P3 operates on the message S7M and generates a response S7R; and then program P4 operates on the message S8M and generates a response S8R.

Next, in time intervals T19–T24, the sequence for executing the message routing program and the data processing program is repeated again. During time interval T19, the message routing program uses one-quarter of the time interval to analyze the message S9M(P1) and send it to the input queue of program P1. Thereafter, the message routing program uses a full-time interval to send four responses S4R, S6R, S7R, and S8R respectively to the stations S4, S6, S7, and S8. Next, during time interval T21, the data processing program P1 operates on the message S9M which is in its input queue, and it sends a response S9R to the output queue of the message routing program. Thereafter, during time interval T25, the response S9R is sent by the message routing program to station S9.

Figure 7:
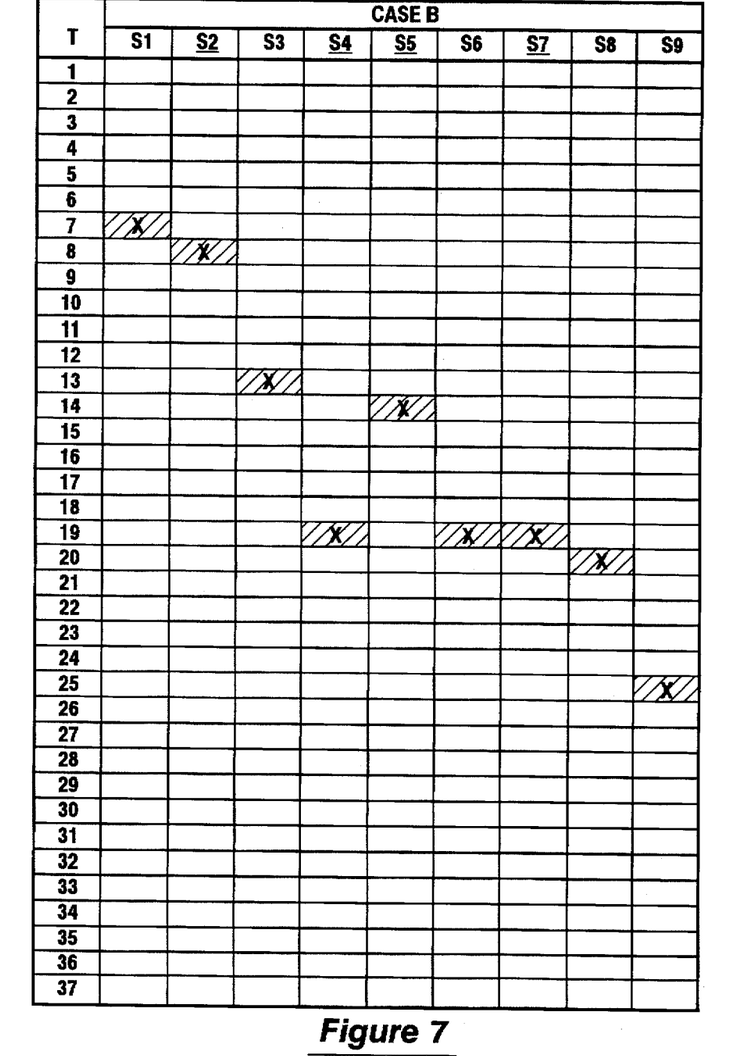
FIG. 7 shows the message response time for all of the messages which are processed in FIGS. 6A–6B.

From the above description of FIGS. 6A and 6B, the message response time of the stations S1–S9 can be illustrated as shown in FIG. 7. This figure shows that the response time for each of the stations which use the simple format is: seven time intervals for station S1, thirteen time intervals for station S3, nineteen time intervals for station S6, twenty time intervals for station S8, and twenty-five time intervals for station S9. By comparison, the response time for the stations which use the complex message format is: eight time intervals for station S2, nineteen time intervals for station S4, fourteen time intervals for station S5, and nineteen time intervals for station S7.

Figure 8:
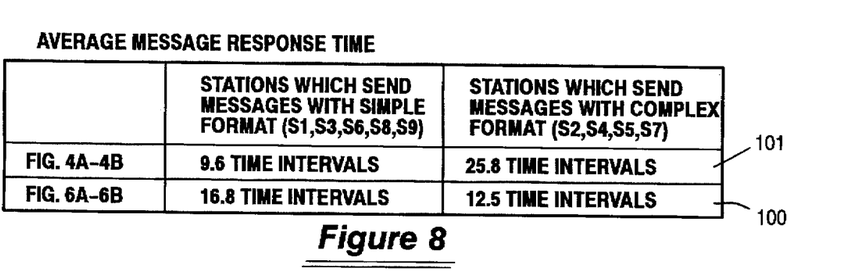
FIG. 8 compares the average message response time for the responses in FIG. 5 with the average message response time for the responses in FIG. 7.

Thus, in FIGS. 6A–6B, the stations which use the simple message format to select a data processing program have a average message response time of 16.8 time intervals; whereas the stations which use the complex message format to select a data processing program have an average response intervals of 12.5 time intervals. These average message response times are listed in FIG. 8 as item 100. Also, for comparison purposes, item 101 in FIG. 8 lists the average message response time for the stations in 4A–4B which send the messages with the simple format and the complex format.

Suppose now, that all of the stations S1–S9 initially were older model stations which send messages with the complex format; and subsequently, an upgrade was made by replacing the stations S1, S3, S6, S8, and S9 with newer model stations which send messages with the simple format. When that upgrade is made and messages are routed in accordance with FIGS. 4A and 4B, the newer model stations which send messages with the simple format have an average message response time which is more than twice as fast as the remaining older model stations. By comparison, when that upgrade is made and messages are routed in accordance with FIGS. 6A–6B, the newer model stations which send messages with the simple format have an average message response time which is longer than the average message response time of the remaining stations!! Consequently, the upgrade which is made in conjunction with FIGS. 6A–6B does not even work.

One preferred embodiment of the invention has now been described in detail. In addition however, various changes and modifications can be made to the details of the described preferred embodiment without departing from the nature and spirit of the invention.

For example, in FIGS. 4A–4B, the respective time intervals for the message routing program, the secondary routing program, and the data processing programs occur in a single repetitive sequence; but as an alternative, the respective time intervals for those programs can occur in a variable sequence in which each program is given a respective time interval only when the program has a message or a response to process. Similarly, in FIGS. 4A–4B, each respective time interval has the same duration; but as an alternative, the respective time intervals for the message routing program, the secondary routing program and the data processing programs can each have a different time duration.

Also in FIGS. 4A–4B, all of the messages which are sent by the stations select data processing programs that send a response back to those stations; but as an alternative some or all of the messages can select other data processing programs which send no response back to the stations. Also in FIGS. 4A–4B, the assumption was made that the messages with the complex second format took one complete time interval to analyze, whereas the messages with the simple first format took only one-quarter of a time interval to analyze; but as an alternative, the relative complexity between the first and second message formats can be different. Preferably, the second format takes at least twice as long to analyze and identify the selected data processing program in comparison to the first format.

Also in the data processing system of FIG. 1, all of the stations which have the complex message format were described as having the format shown in FIG. 3; but as an alternative, the complex message format can include multiple subformats which varies from station to station. For example, some of the stations which have the complex message format could send two dozen different transaction codes, with respective priorities, while other stations which have the complex message format could send three dozen different transaction codes with different priorities. Further, in the data processing system of FIG. 1, all of the stations are shown as being coupled to a single communications channel 11 on which the messages are sent in a time-shared fashion; but as an alternative, some or all of the stations can be coupled to the computer via respective dedicated channels.

Accordingly, it is to be understood that the invention is not limited just the illustrated preferred embodiment but is defined by the appended claims.

What is claimed is:

1. A data processing system which includes: a digital computer that has a plurality of data processing programs; a first set of stations, coupled to said computer, which generate messages that employ a first format to select said data processing programs; a second set of stations, coupled to said computer, which generate messages that employ a second format to select said data processing programs, where said second format is substantially more complex than said first format; a message routing program in said computer which receives all of said messages from said stations, analyzes each message that has said first format to identify the selected data processing program, and sends the message directly to the selected program; said computer further including a secondary routing program, and said message routing program being structured to send each message that has said second format to said secondary routing program; said secondary routing program being structured to analyze each message which it receives, identify the selected data processing program, and send the message to the selected program; and, said message routing program, said secondary routing program, and said data processing programs all being executed sequentially by said digital computer in respective time intervals.

2. A data processing system according to claim 1 herein said respective time intervals for said message routing program, said secondary routing program, and said data processing programs occur in a single repetitive sequence.

3. A data processing system according claim 1 wherein said respective time intervals for said message routing program, said secondary routing program, and said data processing programs occur in a variable sequence in which each program is given a respective time interval only when the program has a message to process.

4. A data processing system according to claim 1 wherein each respective time interval has the same duration which is predetermined.

5. A data processing system according claim 1 wherein said data processing programs send respective responses to said message routing program, and said message routing program routes each such response to a respective station.

6. A data processing system according to claim 1 wherein said messages with said second format take at least twice as long to analyze and identify the selected data processing program, in comparison to said messages with said first format.

7. A data processing system according to claim 1 wherein said messages with said second format have character strings in multiple locations which select said data processing programs, whereas said messages with said first format have character strings in just a single location which select said data processing programs.

8. A data processing system according to claim 1 wherein said messages with said second format have character strings which select said data processing programs with respective priorities, whereas said messages with said first format have character strings which select said data processing programs without respective priorities.

9. A data processing system according to claim 1 wherein said second format includes multiple subformats which vary from station to station in said second set.

10. A data processing system according claim 1 wherein said stations are coupled to said computer via a single time-shared channel.

11. A data processing system according claim 1 wherein said stations are coupled to said computer via respective dedicated channels.

* * * * *